UNITED STATES PATENT OFFICE.

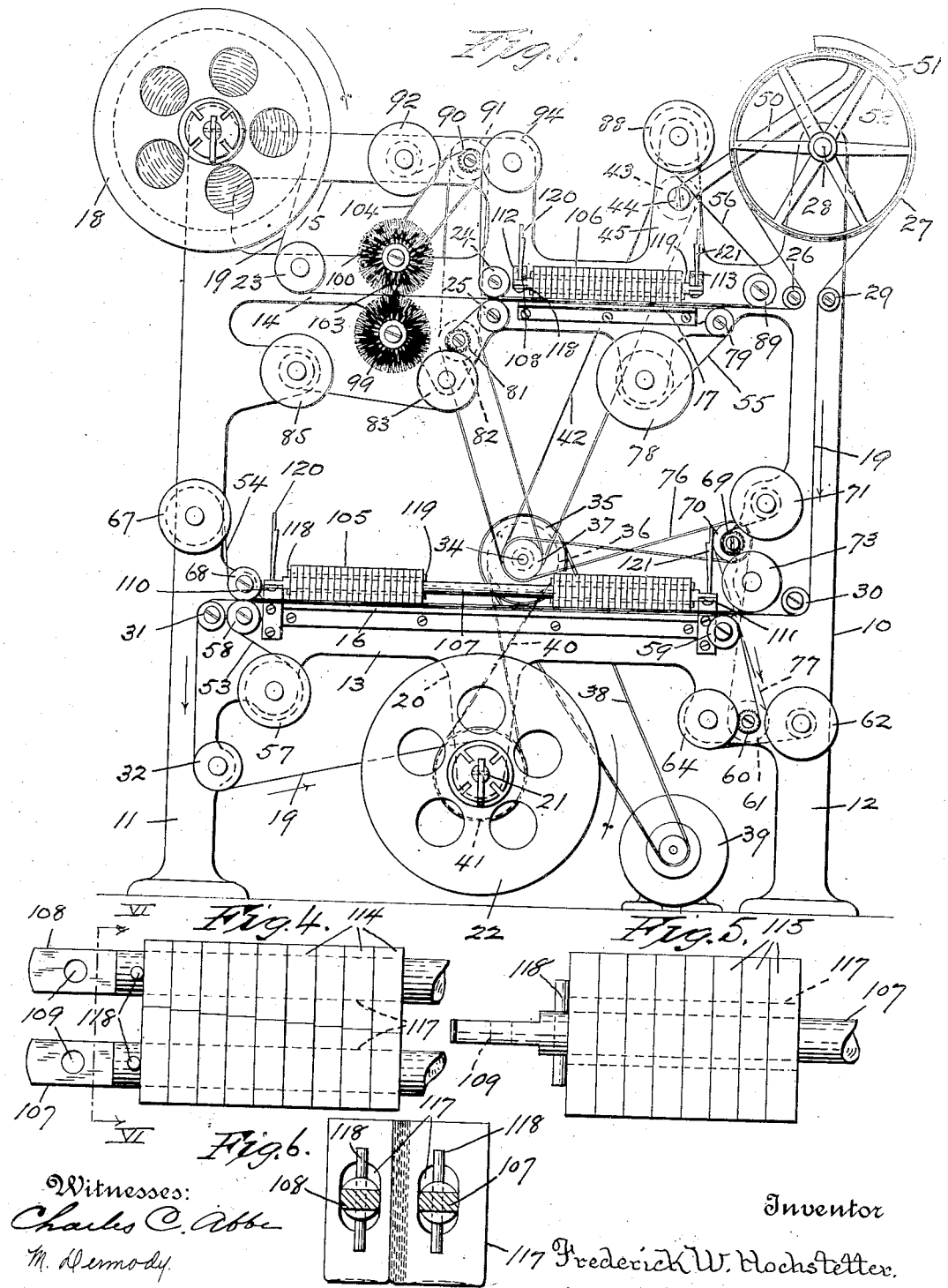

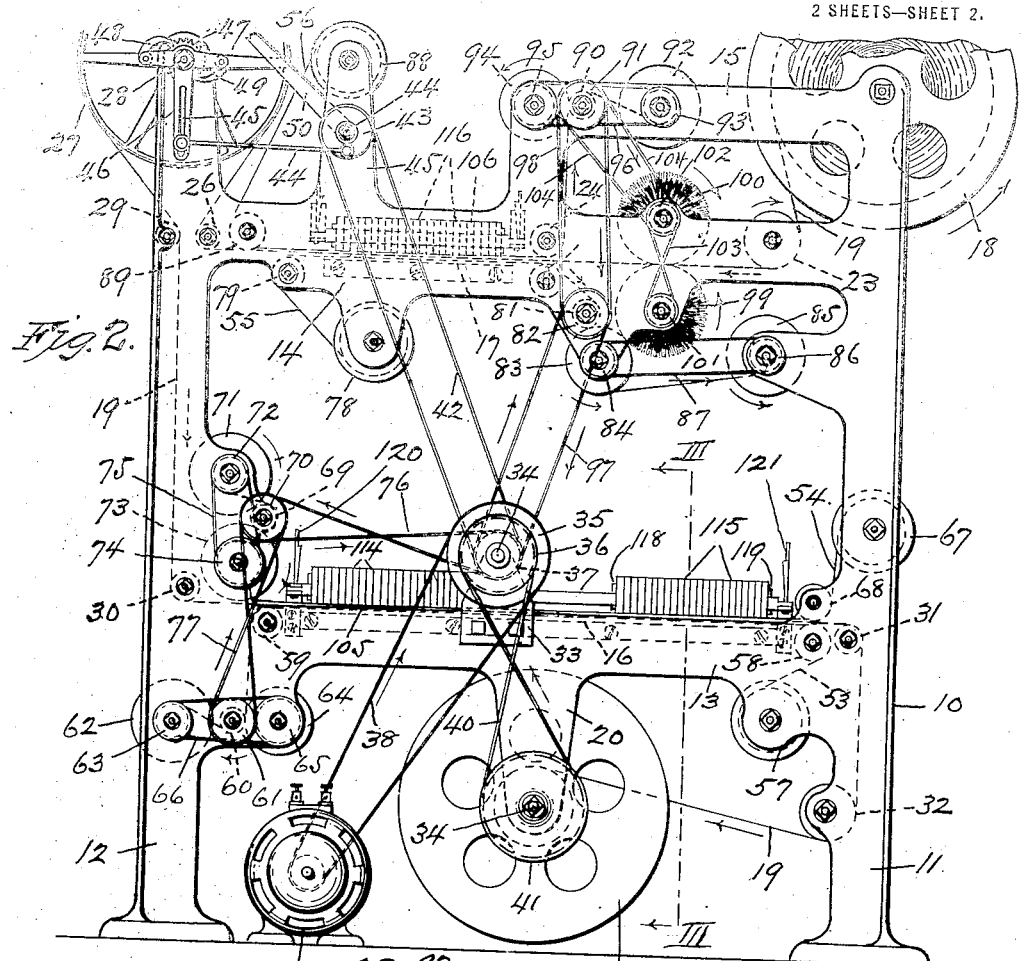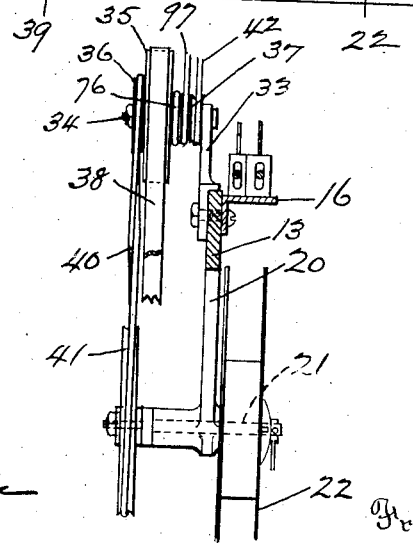

FREDERICK W. HOCHSTETTER, OF NEW YORK, N. Y., ASSIGNOR TO PAUL M. PIERSON, OF SCARBOROUGH-ON-THE-HUDSON, NEW YORK.

APPARATUS FOR RESTORING BLEMISHED MOVING-PICTURE FILMS.

1,227,138.

Specification of Letters Patent.     Patented May 22, 1917.

Application filed September 22, 1914. Serial No. 862,925.

*To all whom it may concern:*

Be it known that I, FREDERICK W. HOCHSTETTER, a subject of the Emperor of Germany, and a resident of New York, county and State of New York, have invented a certain new and useful Apparatus for Restoring Blemished Moving-Picture Films, of which the following is a full, clear, and exact specification.

This invention relates to a class of processes for treating impaired moving picture films.

My invention has for its object primarily to provide means for restoring blemished moving picture films when the photography of the pictures is blurred by oxids of silver salts, or when the transparency of the film is impaired by deposits of foreign substances, such as particles of dust, oil spots and the like, as well as for softening the texture of the emulsion on the film when it becomes hard and brittle. This is accomplished mainly by providing one or more single, or one or more pairs of ribbon-like cleaning buffers or strips and mechanism whereby a film is transmitted in frictional contact with the strips so that successive parts of the film will be engaged by successive portions of the strips and so that the parts of the strips which have contacted with the film will not recontact therewith, in order to prevent the foreign substances cleared from the film from being redistributed thereon, a number of the buffer strips being preferably provided with a cleaning material which is distributed in consecutive quantities on consecutive parts of the film while the other buffer-strips serve to remove the material therefrom. The foreign substances on the film and the texture of its emulsion will thereby be subjected to the softening influence of the cleaning material and by its subsequent removal the transparency of the pictures and flexibility of the film will be restored.

A further object of the invention is to provide one or a number of presser devices for yieldingly holding parts of the buffer-strips and the film in frictional contact.

With these and other objects in view the invention will be hereinafter more particularly described with reference to the accompanying drawings which illustrate an efficient form of carrying into practice my method for restoring moving picture films.

In the drawings, Figure 1 is a front elevation of one form of machine adapted to be employed in carrying out my invention.

Fig. 2 is a rear elevation of the machine, part of which is fragmentary.

Fig. 3 is a view taken on the line III—III of Fig. 2.

Fig. 4 is an enlarged fragmentary view looking downward upon one of the presser elements used in the machine.

Fig. 5 is an enlarged fragmentary view showing a side elevation of the presser element illustrated in Fig. 4, and Fig. 6 is a section, partly in detail, taken on the line VI—VI of Fig. 4.

The form of machine I prefer to employ in practice for carrying into effect my invention has, as illustrated in the drawing, a substantially square frame 10 constructed with two spaced uprights 11 and 12, and between these uprights are three transversely disposed bars 13, 14, 15 in spaced relation one above the other, all of which may be supported on a suitable base. Extending outwardly from the transverse bar 13 is a shelf 16, and also projecting outwardly from the transverse bar 14 is a second shelf 17.

On the upper end of the frame 10 at the juncture of the upright 11 with the transverse bar 15 is a delivery reel 18 on which is wrapped the blemished film, as 19, adapted to be transmitted through the machine for treatment to remove the blemishes therefrom, and this delivery reel is removably mounted on a short shaft, or bolt extending outwardly from the front of the frame. On the central part of the transverse bar 13 is a depending arm 20 having a bearing in which is journaled a shaft 21 extending some distance beyond the rear as well as the front of the arm. On this shaft 21 in front of the frame is detachably held a reel 22 which is revoluble when the shaft is rotated, and this reel is adapted to receive the restored film after it is transmitted through the machine. When the blemished film is positioned in the machine for being treated it is guided from the delivery reel 18 under a roller 23 rotatably arranged on the front of the transverse bar 14, and the film is passed between two small rollers 24, 25 also provided in this transverse bar adjacent to one end of the shelf 17. The film is then directed over the shelf 17, under a small roller 26 on the other end of the transverse bar 14, and the film is guided over the wheel 27 held on a shaft 28 journaled in the upper end of the upright 12 of the frame of the machine so as to be adapted to be revolved for feeding the film, as will be hereinafter more fully explained. From the wheel 27 the film is passed over a small roller 29 on the upright 12 in close proximity to the roller 26, after which the film is passed over a roller 30 arranged on this upright contiguous to the shelf 16 of the transverse bar 13. The film is guided over the shelf 16, over rollers 31 and 32 provided on the upright 11 of the frame, and the film is then delivered to the receiving reel for being wrapped thereon.

Serving to transmit the film through the machine, in a bracket 33 projecting upwardly from the central part of the rear of the transverse bar 13 is journaled a shaft 34 on which three pulleys 35, 36, 37 of different diameters are held, the small pulley 37 having three grooves in its periphery. Over the pulley 35 is guided a belt 38 which passes over the drive pulley of an electrically operative motor, as 39, by which the machine may be driven, though any other suitable power instead thereof may be employed for operating the machine. Over the pulley 36 is passed a belt 40 which is guided over a pulley 41 held on the rear end of the shaft 21 of the receiving reel 22 so that this reel may be rotated simultaneously with the operation of the machine. In one of the grooves of the pulley 37 is passed a belt 42 which is also passed over a pulley, or grooved crank-wheel 43 held on one end of a bolt, or shaft 44 which is rotatable in an arm 45 extending upwardly from the transverse bar 14 of the frame of the machine and in proximity to the wheel 27. To the crank-wheel 43 is eccentrically pivoted one end of a rod 44 having its other end slidably pivoted in the slot 45 of the vertical arm of a substantially T-shaped lever 46 which is rotatably held on the shaft 28 of the wheel 27 so that the vertical arm of the T-shaped lever may be swung transversely to alternately move the cross-arms of this lever in upward and downward directions. Also on the shaft 28 is a cogwheel 47 formed with V-shaped peripheral teeth which are movably engaged by two pawls 48 and 49, one being pivoted to each of the cross-arms of the lever 46 so as to engage opposite parts of the cogwheel. The ends of the pawls 48 and 49 in engagement with the cogwheel are beveled to permit these pawls to rotate the cogwheel from left to right for correspondingly revolving the shaft 28 and the wheel 27 when the T-shaped lever is swung, as above mentioned, by the rod 44 and the crank-wheel 43. The crank-wheel 43 is rotated by the belt 42 which is driven by the rotation of the double-grooved pulley 37 and the shaft 34, through the driving of the belt 38 by the motor 39. The rotation of the wheel 27 by the operation of these parts in this manner will transmit the film from the delivery reel 18 under the roller 23, over the shelf 17, over the roller 26, over the wheel 27, over the roller 29, over the roller 30, over the shelf 16, over the rollers 31, 32, and to the receiving reel 22 which is driven by the pulley 41, belt 40, and the pulley 36 when operated by the rotation of the shaft 34. To hold the film properly on the wheel 27 to the bolt, or shaft 44 of the pulley 43 is held one end of an arm 50 having a curved shoe, as 51, provided with a strip of felt, or like soft material, as 52, on its underside and this arm and shoe are disposed on the top of the wheel 27 so that the strip of felt of the shoe rests on the film in a manner to permit free movement of the film when passed through the machine.

In order to remove from the blemished film the oxids of silver salts of the pictures which may be produced by the heat focused thereon when the film is transmitted through a projecting apparatus, and to also clear the film of all particles of dust and oil spots deposited thereon as well as serving to restore the flexibility of the film which often becomes hard and brittle by use, the film when transmitted through the machine is caused to be moved in frictional contact with one or more single, or one or more pairs of ribbon-like buffers or strips, as 53, 54, 55, 56, of flannel, felt, plush, or any other soft material adapted to wipe and buff the film. The buffer-strip 53 is delivered to the machine from a reel 57 rotatable on a stud or bolt held to the transverse bar 13 of the frame 10 in proximity to the upright 11 of the frame and from this reel the buffer-strip is guided over a roller 58 arranged on this bar at one end of the shelf 16. The buffer-strip 53 is then passed over the shelf 16 so as to be moved in frictional contact with the underside of the film, after which it is passed over a roller 59 on the transverse bar 13 at the other end of the shelf 16. This buffer-strip is guided over a peripherally toothed wheel 60 held on a stud or bolt journaled in this transverse bar adjacent to the upright 12 of the frame of the machine, and also on this stud of the toothed wheel is a pulley 61. From the toothed wheel 60 the buffer-strip passes to a receiving reel 62 held on a stud or bolt journaled in the upright 12 of the frame 10 contiguous to the toothed wheel, and also on the stud of the receiving reel is a pulley 63. In contact with the buffer-strip 53 as it moves over the toothed wheel 60 is a roller 64 held on a stud or bolt journaled in the transverse bar 13 adjacent to the toothed wheel, so as to be frictionally rotated thereby, and on the stud of this roller is held a pulley 65. Over the pulleys 63 and 65 is guided a slip belt 66. The buffer-strip 54 is delivered to the machine from a reel 67 rotatable on a stud or bolt held to the upright 11 of the frame 10 somewhat above the shelf 16, and from this reel the buffer-strip is guided over a roller 68 arranged on the frame of the machine adjacent to the roller 58. The buffer-strip is then passed over the shelf 16 so as to be in frictional contact with the top surface of the film, after which it is passed over a peripherally toothed wheel 69 held on a stud or bolt journaled in the upright 12 of the frame of the machine above the shelf 16, and on the stud of this toothed wheel is a double pulley 70. From the toothed wheel 69 the buffer-strip 54 passes to a receiving reel 71 held on a stud or bolt journaled in the upright 12 of the frame 10 above the toothed wheel, and also on the stud of this receiving reel is a pulley 72. In contact with the toothed wheel 69 is a roller 73 held on a stud or bolt journaled in the frame of the machine below the toothed wheel so as to be frictionally rotated by this wheel, and on the stud of this roller is held a pulley 74. Over the pulleys 72 and 74 is guided a slip belt 75. In this manner the buffer-strips 53 and 54 are adapted to be guided across the shelf 16 in an opposite direction to the transmission of the film, and to move the buffer-strips 53 and 54 through the machine simultaneously with the transmission of the film. In the second groove of the pulley 37 of the shaft 34 and over the double pulley 70 is guided a belt 76. Also over the pulley 70 and over the pulley 61 on the stud of the toothed wheel 60 is guided a belt 77, thus when the film is transmitted through the machine, as above described, the driving of the shaft 33, the rotation of the pulley 37 to drive the belt 76, the toothed wheel 69, the double pulley 70, the roller 73, the pulley 74, the belt 75, the pulley 72, and the receiving reel 71 will be driven so that the buffer-strip 54 will be moved across the shelf 16 in frictional contact with the top surface of the film and in an opposite direction thereto. Simultaneously with the operation of these parts the belt 77 will be driven to impart rotation to the pulley 61, the toothed wheel 60, the roller 64, the pulley 65, the belt 66, the pulley 63, and the receiving reel 62 so as to likewise transmit the buffer-strip 53 over the shelf 16 in frictional contact with the undersurface of the film. The buffer-strip 55 is delivered to the machine from a reel 78 rotatable on a stud or bolt held to the transverse bar 14 of the frame of the machine in proximity to one end of the shelf 17, and from this reel the buffer-strip is guided over a roller 79 arranged on this bar at one end of the shelf. The buffer strip 55 is then passed over the shelf 17 so as to be moved in frictional contact with the underside of the film when transmitted over this shelf, after which it is passed over the roller 25 on the transverse bar 14 at the other end of the shelf. The buffer-strip is guided over a peripherally toothed wheel 81 held on a stud or bolt journaled in this transverse bar, and also on the stud of the toothed wheel is a double pulley 82. From the toothed wheel 81 the buffer strip is guided over a roller 83 in contact with the buffer-strip as it moves over this toothed wheel so as to be frictionally revolved by the wheel, and this roller is held on a stud or bolt journaled in the frame 10. Also on the stud of the roller 83 is a pulley 84. The buffer-strip 55 is delivered from the roller 83 to a receiving reel 85 held on a stud or bolt journaled in the upright 11 of the frame of the machine, and on this stud is a pulley 86. Over the pulleys 84 and 86 is guided a belt 87. The buffer-strip 56 is delivered to the machine from a reel 88 rotatable on a stud or bolt held in the upper end of the vertical arm 45 of the transverse bar 14 of the frame of the machine, and from this reel the buffer-strip is passed over a roller 89 arranged on the transverse bar 14 above the roller 79 of the buffer-strip 55. From the roller 89 the buffer-strip 56 passes over the shelf 17 so as to be moved in frictional contact with the top surface of the film when transmitted over this shelf, after which it is passed over the roller 24, then the buffer-strip is directed upwardly and passed over a peripherally toothed wheel 90 held on a stud or bolt journaled in the transverse bar 15 of the frame of the machine, and on the stud of this toothed wheel is a double pulley 91. From the toothed wheel 90 the buffer-strip 56 is delivered to a receiving reel 92 held on a stud or bolt journaled in the transverse bar 15, and on this stud is a pulley 93. In contact with the buffer-strip 56 as it moves over the toothed wheel 90 is a roller 94 adapted to be frictionally rotated by the wheel. The roller 94 is held on a stud or bolt journaled in the transverse bar 15, and also on this stud is a pulley 95 having a slip belt 96 guided thereover as well as over the pulley 93. The buffer-strips 55 and 56, like the strips 53 and 54, are adapted to be moved across the shelf 17 in an opposite direction to the transmission of the film, and to transmit the buffer-strips 55 and 56 also in unison with the movement of the film, in the third groove of the pulley 37 of the shaft 34 and over the double pulley 82 is guided a belt 97. Also over the pulley 82 and over the double pulley 91 is guided a belt 98. The belts 97 and 98 will be driven when the film and the buffer-strips 53 and 54 are transmitted through the machine, as hereinbefore mentioned, by the driving of the shaft 33 and the rotation of the pulley 37 thereon. The toothed wheel 81, the pulley 82, the roller 83, the pulley 84, the belt 87, the pulley 86, and the receiving reel 85 will then be operated to transmit the buffer-strip 55 over the shelf 17 from the receiving reel 78, in frictional contact with the undersurface of the film. With the operation of these parts of the pulley 91, the toothed wheel 90, the roller 94, pulley 95, the belt 96, the pulley 93, and the receiving reel 92 will also be operated to transmit the buffer-strip 56 over the shelf 17 from the receiving reel 88 in frictional contact with the top surface of the film, the belts 66, 75, 87, 96 serving not only to drive the sets of pulleys 63 and 65, 72 and 74, 84 and 86, 93 and 95, respectively, but these belts are also adapted to slip on their pulleys sufficiently to allow for the gradual increase of strain on the buffer-strips as the diameters thereof increase while being wrapped on their receiving reels, thereby regulating the strain on the buffer-strips to prevent breaking thereof as well as serving to closely wrap the buffer-strips on the receiving reels.

The buffer-strips 55 and 56 are preferably provided with a cleaning substance, such as a grease solvent in the form of an oil, or a fatty mass like petrolatum which may be mixed with alcohol, or ether, and in instances camphor or other solvents may be used in conjunction therewith so as to efficiently free the blemished pictures of the film of all oxids of silver salts as well as clear the film of all particles of dust, spots of oil, and other foreign matter. When the film and the buffer-strips 55 and 56 are transmitted over the shelf 17 of the frame of the machine the cleaning substance is frictionally rubbed into the surfaces of the film for clearing it of all the foreign matter and also for softening the texture of the film which may have become hard and brittle by passing through a projecting apparatus. By then transmitting the film between the buffer-strips 53 and 54 which are free of any cleaning substance the film will be cleared of all surplus of the cleaning substance as well as being buffed to also remove any scratches in the emulsion of the film besides clearing the pictures thereof.

In order to remove from the film all surplus of dust, or the like before being subjected to the cleaning substance of the buffer-strips 55 and 56, the film may be passed between two circular buffers or crushers, as 99 and 100. The circular buffers 99 and 100 may be of hair, felt, or other soft material, and these buffers are held on studs or bolts journaled at spaced intervals one above the other in the transverse bar 14 of the frame of the machine in proximity to the delivery reel 18 to permit the peripheral edges of the buffers to contact with both surfaces of the film. Also on the studs of the buffers 99 and 100 are pulleys 101 and 102, respectively, and over these pulleys is guided a belt 103. Over the pulley 91 on the stud of the toothed wheel 90 is guided a belt 104 which is also passed over the pulley 102 of the buffer 100 so that when the buffer-strips 55 and 56 are transmitted through the machine, as above described, the belt 104 will be driven to revolve the buffer simultaneously therewith, and the film will be freed of part of the foreign matter thereon before being treated by the cleaning substance.

For the purpose of holding the buffer-strips and the film in yielding frictional contact when transmitted over the shelves 16 and 17 of the machine, presser devices, as 105 and 106, are provided. Each of the presser devices has two supporting rods 107 and 108 arranged in spaced parallel relation longitudinally above each of the shelves 16 and 17, respectively, of the machine, and through the end part of each supporting rod is an opening 109. The apertured ends of the pair of supporting rods 107 and 108 of the presser device 105 are disposed on brackets 110 and 111 secured on the frame of the machine at the ends of the shelf 16 to space this pair of the rods somewhat above the shelf, and the apertured ends of the pair of supporting rods 107 and 108 of the presser device 106 are disposed on brackets 112 and 113 also secured on the frame of the machine at the ends of the shelf 17 to space these rods somewhat above this shelf. At spaced intervals on the pair of rods 107 and 108 of the presser device 105 are two sets of weights, or blocks, of metal, as 114 and 115, and on the pair of rods 107 and 108 of the presser device 106 is one set of similar weights, or blocks, of metal, as 116. The weights of each set may be substantially rectangular in shape, and through the weights of each set are vertically disposed registered openings 117 through which one of the rods is disposed, the openings of all the weights being larger than the rods to allow the weights to be raised or lowered on their rods independently of one another to and from the shelves 16 and 17. The weights of each set are in movable abutting arrangement, and the opposed edges of the weights of each set are also in movable abutting arrangement. If desired the weights of each set may be of different widths, as shown, so that when assembled on the rods the narrow weights of one set will be disposed alongside the wide weights of the adjacent set, and to hold the weights of each pair of sets on the supporting rods when thus assembled from each of the rods at the ends of each set of weights are projecting pins, as 118 and 119, whereby the weights may freely move in upward and downward directions, but the weights will be prevented from lateral movement on the rods. In this manner each set of the weights normally rest on top of the buffer-strips and the film while being transmitted over the shelves 16 and 17 to hold the strips in frictional contact with the film, at the same time allowing free transmission of the strips and the film. By providing these forms of the presser devices the edges of the buffer-strips will be prevented from curling and traveling irregularly over the shelves, thereby properly cleaning and buffing the surfaces of the film. In order to permit the presser devices 105 and 106 to be raised above the shelves 16 and 17 to allow the film and the buffer-strips to be arranged thereon, through the openings 109 of each of the supporting rods 107 and 108 are disposed posts 120 and 121 of spring metal. The lower end of each of the posts 120 and 121 is fixed to the bracket supporting its respective end of the rod thereof, and each spring post is of a size whereby the rod may be moved upwardly thereon. The upper parts of the spring posts of each of the supporting rods are disposed slightly toward each other so that when the rods and the sets of weights are raised above the shelves 16 and 17 they will be yieldingly held for the film and the buffer-strips to be arranged on the shelves, after which the rods and the weights are reversely moved to their normal positions on the strips and the film. Thus by transmitting the strips and the film in this manner through the machine successive parts of the film will be engaged by successive portions of the buffer, or cleaning strip, so that foreign substances cleared from the film are less likely to be redistributed thereon than in the methods wherein rollers, brushes, or revoluble buffers are employed.

While I have illustrated and described in the foregoing a form of machine especially adapted for use in carrying out this invention, it will be understood that this method of restoring picture films may be effectually practised by the employment of other forms of machines or apparatus wherein the film is passed in frictional contact with one or more single buffer-strips, or one or more pairs of buffer-strips which may be moved synchronously with the film, or the buffer-strips may be held stationary if desired, therefore I reserve to myself the right to use any suitable means for transmitting a blemished moving picture film in frictional contact with a ribbon-like buffer or strip so that parts of the strips which have contacted with the film will be prevented from re-contacting therewith.

Having thus described my invention, I claim as new and desire to secure by Letters Patent:—

1. In a machine for cleaning moving picture films, the combination with a storage reel and a receiving reel, of a cleaning web carried thereby, of means for moving said web, and means for intermittently transmitting a film in frictional contact with said moving web.

2. In a machine for cleaning moving picture films, the combination with a plurality of storage and receiving reels, of a plurality of cleaning webs carried thereby, means for bringing successive portions of said webs into juxtaposed position, and means for transmitting a film longitudinally of and in frictional contact with the juxtaposed portions of said webs.

3. In a machine for cleaning moving picture films, the combination with a plurality of storage and receiving reels, of a plurality of cleaning webs carried thereby, means for moving said webs in opposite directions and bringing successive portions thereof into juxtaposed position, and means for transmitting a film in frictional contact with said oppositely moving webs.

4. In a machine for cleaning moving picture films, the combination with a cleaning strip, of means for transmitting a film in frictional contact therewith, and gravity controlled means for maintaining the strip in yielding engagement with the film.

5. In a machine for cleaning moving picture films, the combination with a cleaning strip, of means for transmitting a film in frictional contact therewith, and means for maintaining the strip in yielding engagement with the film, said last mentioned means comprising a vertically movable weight.

6. In a machine for cleaning moving picture films, the combination with a cleaning strip, of means for transmitting a film in frictional contact therewith, means for maintaining the strip in yielding engagement with the film, and means whereby said last mentioned means may be held in inoperative position.

7. In a machine for restoring blemished moving picture films, the combination of a cleaning strip, means for moving the strip, and means for transmitting a film in frictional contact therewith under pressure synchronously with the movement of the strip and in an opposite direction thereto.

8. In a machine for restoring blemished moving picture films, the combination of a cleaning strip, means for moving the strip, and means for transmitting a film in frictional contact therewith under pressure synchronously with the movement of the strip and in the same direction.

9. In a machine for restoring blemished moving picture films, the combination of a pair of cleaning strips, means for moving the strips in opposite directions, and means for transmitting a film in frictional contact with the strips under pressure synchronously with the movement of said strips.

10. In a machine for restoring blemished moving picture films, the combination with a cleaning strip, of means for continuously moving said strip, and means for intermittently moving a film and maintaining said strip and said film in frictional contact.

11. In a machine for restoring blemished moving picture films, the combination with a pair of cleaning strips, of means for continuously moving said strips and bringing successive portions thereof into parallel position, and means for intermittently transmitting a film between the parallel portions of said strips and maintaining the same in frictional contact therewith.

This specification signed and witnessed this twenty-first day of September A. D. 1914.

FREDERICK W. HOCHSTETTER.

Witnesses:
ROBT. B. ABBOTT,
M. DERMODY.